Dec. 26, 1967 R. M. WARNER, JR., ET AL 3,360,698

DIRECT CURRENT SEMICONDUCTOR DIVIDER

Filed Aug. 24, 1964 2 Sheets-Sheet 1

INVENTOR.
Raymond M. Warner Jr.
Yehuda A. Konnan

BY Mueller & Aichele

ATT'YS.

Dec. 26, 1967 R. M. WARNER, JR., ET AL 3,360,698

DIRECT CURRENT SEMICONDUCTOR DIVIDER

Filed Aug. 24, 1964 2 Sheets-Sheet 2

INVENTOR.
Raymond M. Warner Jr.
Yehuda A. Konnan

BY Mueller & Aichele

ATT'YS.

United States Patent Office 3,360,698
Patented Dec. 26, 1967

3,360,698
DIRECT CURRENT SEMICONDUCTOR DIVIDER
Raymond M. Warner, Jr., Scottsdale, Ariz., and Yehuda A. Konnan, Arlington, Mass., assignors to Motorola, Inc., Franklin Park, Ill., a corporation of Illinois
Filed Aug. 24, 1964, Ser. No. 391,673
3 Claims. (Cl. 317—235)

This invention relates generally to the semiconductor art, and in particular to a semiconductor voltage divider which supplies regulated voltage.

The familiar resistive voltage divider sometimes requires correction for variations in input voltage level and variations in the circuit load in order to maintain constant voltages at its tap points. A non-fluctuating voltage divider can be provided by connecting a zener diode of appropriate rating between each tap point and the low voltage supply terminal. This circuit, known as a zener controlled voltage divider, offers better regulation than the resistive divider, but it still has some drawbacks. Since a zener diode must be in conduction in order to regulate voltage, the circuit draws some current even when none is being supplied to the load. For applications where power must be conserved, as is the case in integrated circuits, for example, the wasted power represented by the unloaded zener currents may be a significant loss.

Where the circuit is subjected to severe ambient temperature changes, the temperature coefficient of the zener diode must be taken into account. In critical applications, the variation of zener voltage with temperature may be enough to require the use of one or more compensating diodes to correct for the temperature coefficient of a zener diode, thus adding cost to the circuit.

The additional complexity involved in adding zener protection to a resistive voltage divider is usually not justified in integrated circuit applications. There has been a need for a simpler self-regulating voltage divider which can be built into integrated circuits more readily.

It is an object of this invention to provide an all semiconductor self-regulating voltage divider.

Another object of the invention is to provide a direct current voltage divider which draws only minimal power when it is not loaded.

A further object of the invention is to reduce the bleeder current which is characteristic of resistive voltage dividers.

Another object of the invention is to provide a semiconductor voltage divider which also regulates voltage and is less sensitive to ambient temperature changes than zener diodes.

Still another object of the invention is to provide a self-regulating voltage divider which can be built into semiconductor integrated circuits without unduly complicating the fabrication processes.

This invention is a semiconductor device which divides an input voltage into a plurality of output voltages by a punch-through mechanism. The input voltage is applied across two input terminals which are connected to the semiconductor element on opposite sides of a rectifying junction in the semiconductor material. The input voltage is applied in the reverse direction such that a depletion region spreads from the input junction to output junctions in the semiconductor element, each of which has an associated output terminal. Each of the output terminals of the device floats at a particular voltage required for the depletion region to reach the corresponding output junction. If the output junctions are located at different distances from the input junction, different voltages will appear at the output terminals.

When no output current is being drawn, only the leakage current of the input junction flows through the device, so the power dissipated by the device in its unloaded condition is negligible. Output current can be drawn without substantially changing the output voltage. The device exhibits low dynamic impedance, much like the reverse characteristic of a zener diode. However, the punch-through phenomenon is less affected by temperature changes than avalanche breakdown which determines zener voltage; an advantage particularly in integrated circuit applications.

Figure 1:
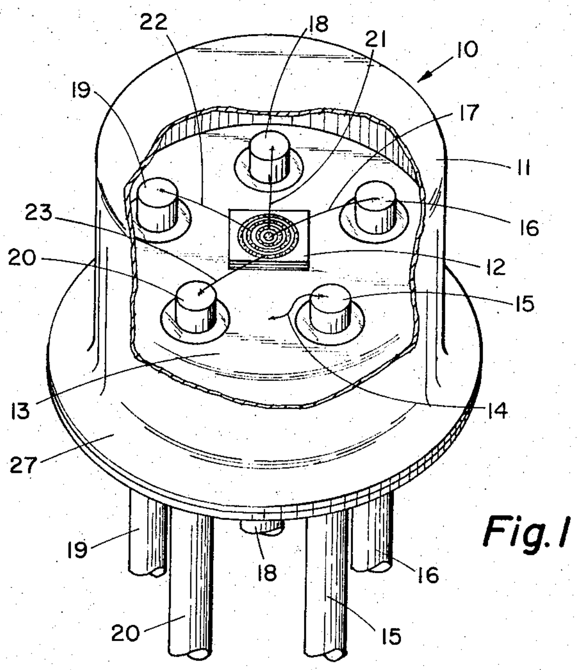
FIG. 1 is an enlarged view of a semiconductor voltage divider in accordance with an embodiment of the invention wherein the divider is a discrete semiconductor device.
Figure 2:
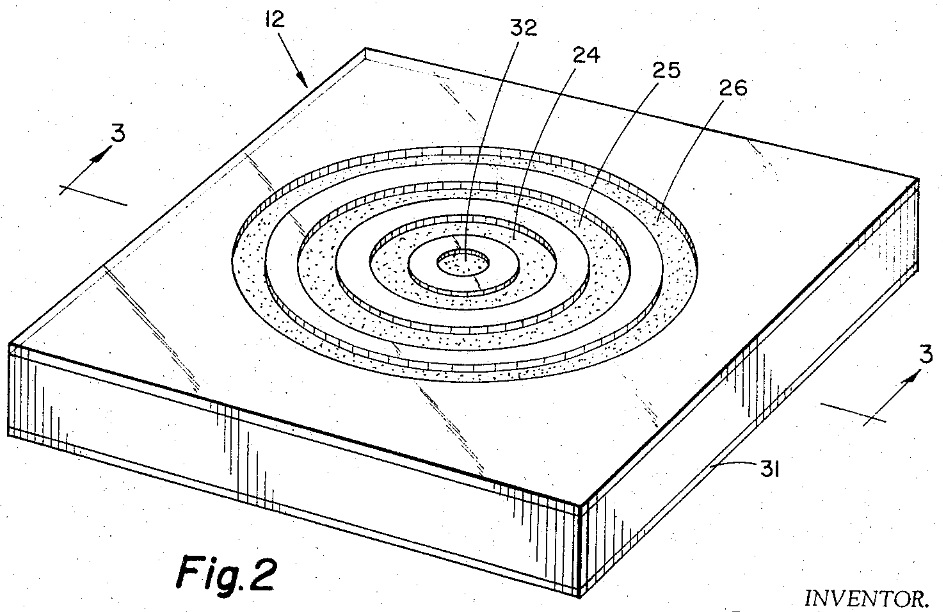
FIG. 2 is an enlarged isometric view of the semiconductor element included in the device of FIG. 1.

Referring first to FIG. 1, the semiconductor device 10 shown there has its cover 11 partially broken away to reveal the semiconductor element 12 and the internal connections to it. The semiconductor element is mounted on and bonded to the metal covering 13 of a header. In this embodiment the metal header covering 13 is connected by a wire 14 to a terminal 15, all of which constitute one input connection to the semiconductor element. The other input connection is provided by the terminal 16 and the wire 17 which connects that terminal to a central contact 32 (FIG. 2) on the element 12. There are three output terminals 18, 19 and 20 connected respectively by wires 21, 22 and 23 to ring-shaped contacts 24, 25 and 26 on the semiconductor element which are more clearly visible in FIGS. 2 and 3. Before leaving FIG. 1 it may be noted that all of the terminals are insulated from the metal header covering 13 by glass or other dielectric material through which the terminals extend to the outside of the device. The cover 11 and the header 13 are joined at the flange 27, as by welding, and form a sealed enclosure for the semiconductor element.

Figure 3:
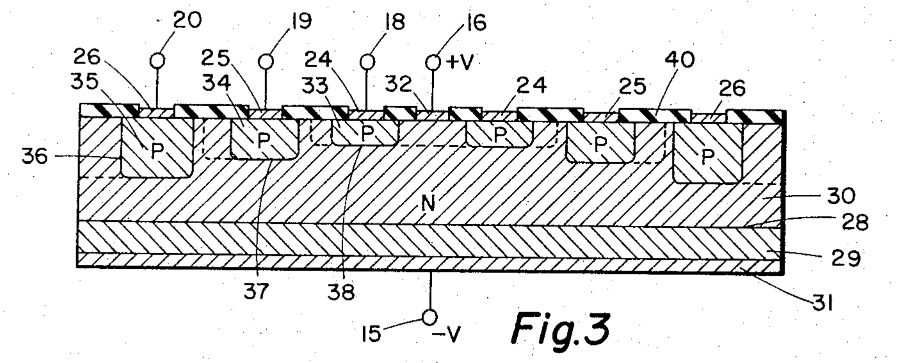
FIG. 3 is a cross-section of the same semiconductor element taken along line 3—3 of FIG. 2.

Within the semiconductor element 12 as shown in FIG. 3, there is a first rectifying junction 28 which will be referred to herein as the input junction. The junction 28 is between a P region 29 on one face of the semiconductor element and the N material 30 within the bulk of the element. The junction 28 may be formed, for example, by diffusion of boron into an N type semiconductor element, or alternately by growing N type semiconductor material epitaxially into a P type crystal element. A metal contact 31, which may be of gold, allows the element 12 to be fused to the metal header covering 13 and provides electrical contact to the P region 29.

On the top side of the semiconductor element 12, there is a central metal contact 32 which is an ohmic connection to the N type material 30. Contacts 31 and 32 together with the associated terminals 15 and 16 are the input connections referred to previously.

The output terminals 18, 19 and 20 are connected by metal contacts 24, 25 and 26, which may be of aluminum, to ring-shaped P regions 33, 34 and 35 within the semiconductor element. The latter regions may be formed by selective diffusion of a P type impurity such as boron into the semiconductor element through openings in a diffusion mask. The diffusion mask is typically an oxide coating on the surface of the semiconductor element, and it may be left in place as shown at 40. It should be understood that the conductivity type of regions 29, 30, 33, 34 and 35 may be reversed if desired.

In FIG. 3 it is apparent that the P regions 33, 34 and 35 extend to different depths in the semiconductor element. The junction 36 bounding P region 35 is closest to the input junction 28, junction 38 bounding P region 33 is farthest from the input junction, and the third junction 37 is at an intermediate distance from the input junction. This staggering of junction depths causes different voltages to appear at the output terminals 18, 19 and 20 in the operation of the device, as will now be described.

The input voltage $V_a$ is applied across terminals 15 and 16 with a polarity to bias the input junction 28 in the reverse direction. The depletion region spreads in both directions from junction 28. The N region 30 is made higher in resistivity than the P layer 29 so that most of the depletion spreading occurs in the N type material 30. With increasing applied voltage, the depletion region will first reach junction 36, and region 35 will float at a voltage $V_{pt1}$ which is the punch-through voltage for that junction. The depletion region will then spread to junction 37 causing region 34 to float at the punch-through voltage $V_{pt2}$ for the latter junction, and finally will reach junction 38 at $V_{pt3}$ which is the punch-through voltage for that junction. Thus, the device divides the applied voltage into three constant voltages $V_{pt1}$, $V_{pt2}$ and $V_{pt3}$ which are determined by the respective distances separating junctions 36, 37 and 38 from the input junction 28.

It is apparent that $V_{pt3}$ must be less than the over-all breakdown voltage of the device. However, the over-all breakdown voltage value is increased by the field spreading which is produced by the junctions 33, 34 and 35 in the manner described and claimed in a copending application of Yehuda A. Konnan, Ser. No. 360,487, filed Apr. 17, 1964, now abandoned, and assigned to the present assignee.

Figure 4:
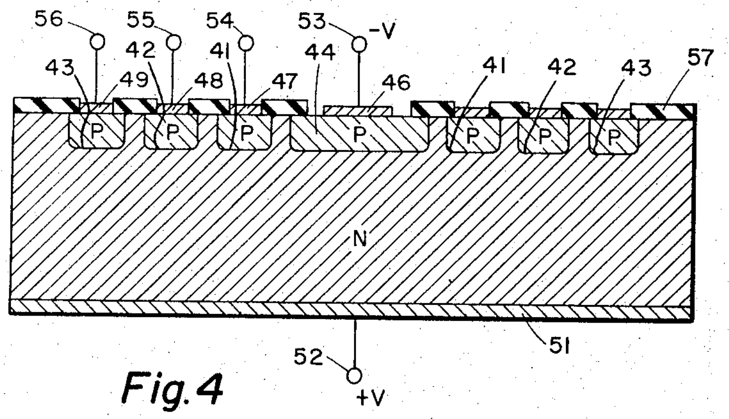
FIG. 4 is a cross-section of another semiconductor element illustrating another embodiment of the invention.

FIG. 4 shows another embodiment of the invention in which the input junction and the output junctions are all on the same face of the semiconductor element. A characteristic feature of this embodiment is that all of the junctions may be of the same depth in the semiconductor material, so the device is easier to fabricate. As shown, the output junctions 41, 42 and 43 surround the input junction 44 and are separated from it at different distances. The metal contacts 46, 47, 48 and 49 are ohmic connections to the P regions, and the metal layer 51 is an ohmic connection to the N material of the semiconductor element. When voltage is applied to the input terminals 52 and 53 with a polarity to reverse bias the input junction 44, a depletion region spreads into the N material, and spreads laterally along the top surface of the semiconductor element as viewed in FIG. 4. The depletion region reaches junction 41 first, then junction 42 and finally junction 43. Thus, the P regions associated with junctions 41, 42 and 43 float at potentials determined by the respective distances between the output junctions and the input junction 44. The voltages just referred to appear at the output terminals 54, 55 and 56.

The junctions 41, 42, 43 and 44 may all be formed by diffusion of a P type impurity such as boron into an N type semiconductor element through openings in an oxide coating a surface of the element. The oxide coating may be left on the semiconductor element for passivation purposes, and such a coating 57 is shown in FIG. 4.

Figure 5:
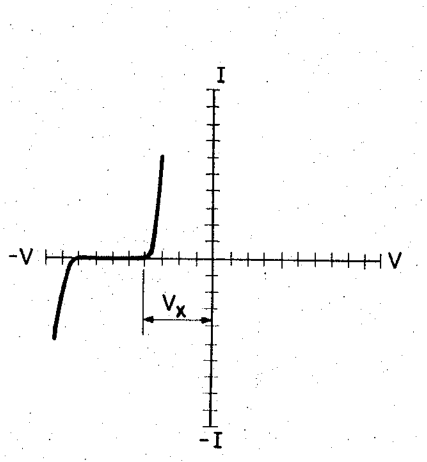
FIG. 5 is a current-voltage characteristic for one of the output terminals of a semiconductor voltage divider in accordance with the invention.

FIG. 5 shows the output current-voltage characteristic for one of the output junctions of the semiconductor voltage divider. The voltage $V_x$ is the difference between the applied voltage and the punch-through voltage of the output junction when that junction is floating at the punch-through voltage. When a load current is drawn, the output junction becomes forward biased and goes into heavy conduction as shown by the upward swing of the curve. The voltage remains nearly constant, and thus the device exhibits a low dynamic impedance as previously mentioned. When the output junction is biased in the reverse direction by the load, the output voltage is pushed in the negative direction until punch-through in the opposite direction occurs, and then heavy conduction begins as shown by the downward sloping portion of the curve.

Figure 6:
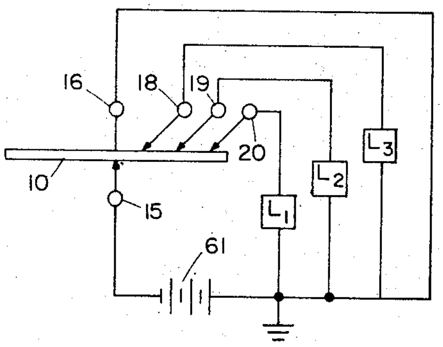
FIG. 6 is a schematic diagram illustrating a typical circuit application of the semiconductor voltage divider.

FIG. 6 shows a typical circuit application for the semiconductor voltage divider. Reference numerals corresponding to those used in FIGS. 1 and 3 are used for like parts in FIG. 6. The voltage source 61 which may be a battery has its negative terminal connected across the input terminals 15 and 16 of the voltage divider 10. Three loads $L_1$, $L_2$ and $L_3$ are connected between the positive battery terminal and the output terminals 18, 19 and 20. The voltage across a given load is the source voltage less the punch-through voltage for the associated output terminal. The voltage is required against variations in the load, and there is very little wasted power because only leakage current flows between terminals 15 and 16.

Although a discrete semiconductor device has been illustrated by way of a workable embodiment of the invention, it will be apparent from the foregoing description that the device may be built as part of an integrated circuit. This may be accomplished by forming the junctions of the voltage divider in the same semiconductor element with other active devices of the integrated circuit, or by using separate semiconductor chips for the semiconductor element and the other active devices but mounting them all in the same package to form a hybrid integrated circuit. The semiconductor voltage divider is particularly well-suited for integrated circuit applications because it has a relatively low temperature coefficient due to the relative insensitivity of the punch-through mechanism to temperature changes.

What is claimed is:

1. A semiconductor voltage dividing device comprising a body of semiconductor material having first and second faces on opposite sides thereof, an input PN junction in said body between a first region of one conductivity type at and beneath said first face and a second region of the opposite conductivity type separated from said first face by said first region, electrical connections to said first and second regions providing a pair of input terminals for said device, a plurality of output PN junctions in said body all defined by said second region with additional regions of said one conductivity type at and beneath said second face of said body, said output junctions extending to different depths in said body beneath said second face and thereby being separated different distances from the plane in which said input PN junction lies so that when a reverse voltage is applied to said pair of input terminals a depletion region will spread from said input junction to reach said output junctions at different levels of reverse voltage applied to said input terminals, and individual electrical connections to said additional regions providing output terminals for said device which exhibit different output voltages corresponding to the level of reverse voltage required to extend a depletion region to the particular output PN junctions to which the output terminals connect.

2. A semiconductor voltage dividing device comprising a body of semiconductor material having first and second faces on opposite sides thereof, an input PN junction in said body between a first region of one conductivity type at and beneath said first face and second region of the opposite conductivity type separated from said first face by said first region, electrical connections to said first and second regions providing a pair of input terminals for said device, a plurality of output PN junctions in said body all defined by said second region with additional regions of said one conductivity type at and beneath said second face of said body, said output junctions extending to different depths in said body beneath said second face and thereby being separated different distances from the plane in which said input PN junction lies so that when a reverse voltage is applied to said pair of input terminals a depletion region will spread from said input junction to reach the output junctions at different levels of reverse voltage applied to said input terminals, said output junctions all being sufficiently close to said input junction to allow a depletion region to spread from said input junction to the farthest output junction at an input voltage below that at which avalanche breakdown of any said junction occurs, and individual electrical connections to said additional regions providing output terminals for said device which exhibit different output voltages corresponding to the reverse voltages required for said depletion region to be extended to the particular output PN junctions to which said output terminals connect.

3. A semiconductor voltage dividing device comprising a body of semiconductor material having first and second faces on opposite sides thereof, an input PN junction in said body between first and second regions therein of opposite conductivity type both extending to said first face, said input PN junction extending from the deepest part thereof to said first face and there surrounding said first region, electrical connections to said first and second regions providing a pair of input terminals for said device, a plurality of output PN junctions in said body all defined by said second region with additional regions at and beneath said first face and of the conductivity type opposite that of said second region, said additional regions being separated from each other by portions of said second region and being separated different distances from the plane in which said input junction lies so that when a reverse voltage is applied to said pair of input terminals a depletion region will spread from said input junction to reach said output junctions at different levels of reverse voltage applied to said input terminals, and individual electrical connections to said additional regions providing output terminals for said devices which exhibit different output voltages corresponding to the particular reverse voltages required for a depletion region to be extended to the particular output PN junctions to which said output terminals connect.

References Cited

UNITED STATES PATENTS

| | | | |
|---|---|---|---|
| 2,832,898 | 4/1958 | Camp | 307—88.5 |
| 2,897,295 | 7/1959 | Zelinka | 179—171 |
| 2,964,648 | 12/1960 | Doucette et al. | 307—88 |
| 2,989,713 | 6/1961 | Warner | 338—20 |
| 3,026,424 | 3/1962 | Pomerantz | 307—88.5 |
| 3,035,186 | 5/1962 | Doucette | 307—88.5 |
| 3,097,336 | 7/1963 | Sziklai | 323—94 |
| 3,103,599 | 9/1963 | Henkels | 307—88.5 |
| 3,112,411 | 11/1963 | Cook et al. | 307—88.5 |
| 3,113,220 | 12/1963 | Goulding et al. | 307—88.5 |
| 3,229,218 | 1/1966 | Sickles et al. | 330—29 |
| 3,254,234 | 5/1966 | Sziklai et al. | 307—88.5 |
| 3,275,911 | 9/1966 | Onodera | 317—235 |

OTHER REFERENCES

| | | |
|---|---|---|
| 915,688 | 1/1963 | Great Britain. |

JAMES D. KALLAM, *Primary Examiner.*

JOHN W. HUCKERT, *Examiner.*

R. SANDLER, *Assistant Examiner.*